(12) United States Patent
Na et al.

(10) Patent No.: US 10,694,349 B2
(45) Date of Patent: Jun. 23, 2020

(54) METHOD AND APPARATUS FOR MONITORING DRIVER IN SYSTEM

(71) Applicants: Hyundai Motor Company, Seoul (KR); Kia Motors Corporation, Seoul (KR)

(72) Inventors: Young Jin Na, Gyeonggi-do (KR); Joon Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 16/208,135

(22) Filed: Dec. 3, 2018

(65) Prior Publication Data
US 2019/0200187 A1  Jun. 27, 2019

(30) Foreign Application Priority Data

Dec. 4, 2017 (KR) .......................... 10-2017-0165488
Sep. 6, 2018 (KR) .......................... 10-2018-0106579

(51) Int. Cl.
| | |
|---|---|
| H04W 4/44 | (2018.01) |
| H04L 29/08 | (2006.01) |
| H04W 4/46 | (2018.01) |
| G07C 5/00 | (2006.01) |
| H04W 4/70 | (2018.01) |
| G07C 5/08 | (2006.01) |

(52) U.S. Cl.
CPC .............. *H04W 4/44* (2018.02); *G07C 5/008* (2013.01); *H04L 67/12* (2013.01); *H04W 4/46* (2018.02); *G07C 5/0808* (2013.01); *H04W 4/70* (2018.02)

(58) Field of Classification Search
CPC ........... H04W 4/44; H04W 4/46; H04W 4/70; H04W 4/90; G07C 5/008; G07C 5/0808; H04L 67/12; H04L 67/22; G08G 1/00; B60K 28/06; B60K 28/063; A61B 5/18; B60W 40/09
USPC ........................................................ 340/439
See application file for complete search history.

(56) References Cited

U.S. PATENT DOCUMENTS

| | | | |
|---|---|---|---|
| 2014/0225719 A1* | 8/2014 | Kesavan .................. | B60Q 1/00 340/425.5 |
| 2014/0313023 A1* | 10/2014 | Hu ........................... | B60Q 9/00 340/436 |
| 2017/0122841 A1* | 5/2017 | Dudar ................... | B60W 40/02 |

* cited by examiner

*Primary Examiner* — Joseph H Feild
*Assistant Examiner* — Sharmin Akhter
(74) *Attorney, Agent, or Firm* — Mintz Levin Cohn Ferris Glovsky and Popeo, P.C.; Peter F. Corless

(57) ABSTRACT

The present invention may provide a method of monitoring, by a vehicle, a driver. Herein, a method of monitoring, by a vehicle, a driver include: receiving a test message from a management center under a first situation (first state); and reporting to the driver of the vehicle the received test message under the first situation. Herein, when the vehicle is under a predetermined second situation, reporting the test message may be suspended, and a message informing of the second situation may be automatically transmitted to the management center.

20 Claims, 11 Drawing Sheets

METHOD AND APPARATUS FOR MONITORING DRIVER IN SYSTEM

CROSS REFERENCE TO RELATED APPLICATION

The present application claims priority to Korean Patent Application No. 10-2017-0165488, and 10-2018-0106579 filed Dec. 4, 2017, and Sep. 6, 2018, respectively, the entire contents of which is incorporated herein for all purposes by this reference.

BACKGROUND OF THE INVENTION

Field of the Invention

The present invention relates to a method and apparatus for monitoring a driver in a system. More particularly, the present invention relates to a method and apparatus for monitoring a driver in a transportation safety system using IoT (Internet of Things).

Description of the Related Art

Recently, using of an M2M (machine-to-machine) system has become active. M2M communication refers to communication performed between machines without intervention of a person. M2M may refer to MTC (machine type communication), IoT (Internet of Things) or D2D (device-to-device). However, in below, for convenience of description, it may be referred as M2M in a unified manner, but it is not limited thereto. A terminal used in M2M communication may be an M2M terminal (M2M device). An M2M terminal may be a device generally transmitting a small amount of data and having low mobility. Herein, an M2M terminal may be used by being connected to an M2M server storing and managing communication information between machines in the management center.

In addition, an M2M terminal may be applied to various systems such as tracking, automobile interlocking, metering, etc.

Meanwhile, a method of providing a service related to an M2M terminal is provided from various standardization organizations.

SUMMARY OF THE INVENTION

An objective of the present invention is to provide a method of monitoring a driver in a system.

Another objective of the present invention is to provide a method of controlling a driver monitoring activity in a system when an emergency situation occurs.

Still another objective of the present invention is to provide a method of performing driver monitoring on the basis of an emergency situation by a vehicle, RSE, and a management center.

According to an embodiment of the present invention, there is provided a method of monitoring, by a vehicle, a driver. Herein, a method of monitoring, by a vehicle, a driver includes:

receiving a test message from a management center under a first situation (first state); and reporting to the driver of the vehicle the received test message under the first situation. Herein, when the vehicle is under a predetermined second situation, reporting the test message is suspended, and a message informing of the second situation is automatically transmitted to the management center.

According to an embodiment of the present invention, there is provided a vehicle performing driver monitoring in a system. Herein, the vehicle includes: a transceiver transmitting and receiving a signal; and a processor controlling the transceiver. Herein, the processor: receives a test message from a management center under a first situation (first state) through the transceiver; reports to the driver of the vehicle the test message received under the first situation; suspends reporting the test message when the vehicle is under a predetermined second situation; and automatically transmits to the management center a message informing of the second situation.

In addition, for the method and vehicle for monitoring a driver, the following features may be commonly applied.

According to an embodiment of the present invention, when the test message is received under the first situation, the vehicle may transmit a reply message for the test message within a preset time to road side equipment (RSE) and the management center.

Herein, according to an embodiment of the present invention, when the RSE and the management center do not receive the reply message within the preset time, the RSE and the management center may perform a counteractive activity.

Herein, according to an embodiment of the present invention, when the RSE and the management center receives the message informing of the second situation, the RSE and the management center may stop performing the counteractive activity.

In addition, according to an embodiment of the present invention, when the vehicle receives the test message, a device layer of the vehicle may deliver the test message to a service support and application support layer of the vehicle.

Herein, according to an embodiment of the present invention, the test message may be reported to the driver on the basis of the service support and application support layer.

In addition, according to an embodiment of the present invention, when the vehicle is under the preset second situation, reporting the test message may be suspended for a preset time, and when the preset time elapses, the test message may be reported.

In addition, according to an embodiment of the present invention, the first situation may be a default situation (default state), and the preset second situation may be an emergency situation (emergency state).

Herein, according to an embodiment of the present invention, when a first condition is satisfied, the vehicle may be set to the preset second situation, wherein the first condition may be set on the basis of at least one of a plurality of sensors and a modem state.

Herein, according to an embodiment of the present invention, the plurality of sensors may be sensors related to the driver of the vehicle.

According to the present invention, there is provided a method of monitoring a driver in a system.

According to the present invention, there is provided a method of controlling a driver monitoring activity in a system when an emergency situation occurs.

According to the present invention, there is provided a method of performing driver monitoring on the basis of an emergency situation by a vehicle, RSE, and a management center.

According to the present invention, there is provided a method of performing driver monitoring by taking into account of a current state of the driver.

Technical problems obtainable from the present invention are not limited by the above-mentioned technical problems, and other unmentioned technical problems may be clearly understood from the following description by those having ordinary skill in the technical field to which the present invention pertains.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
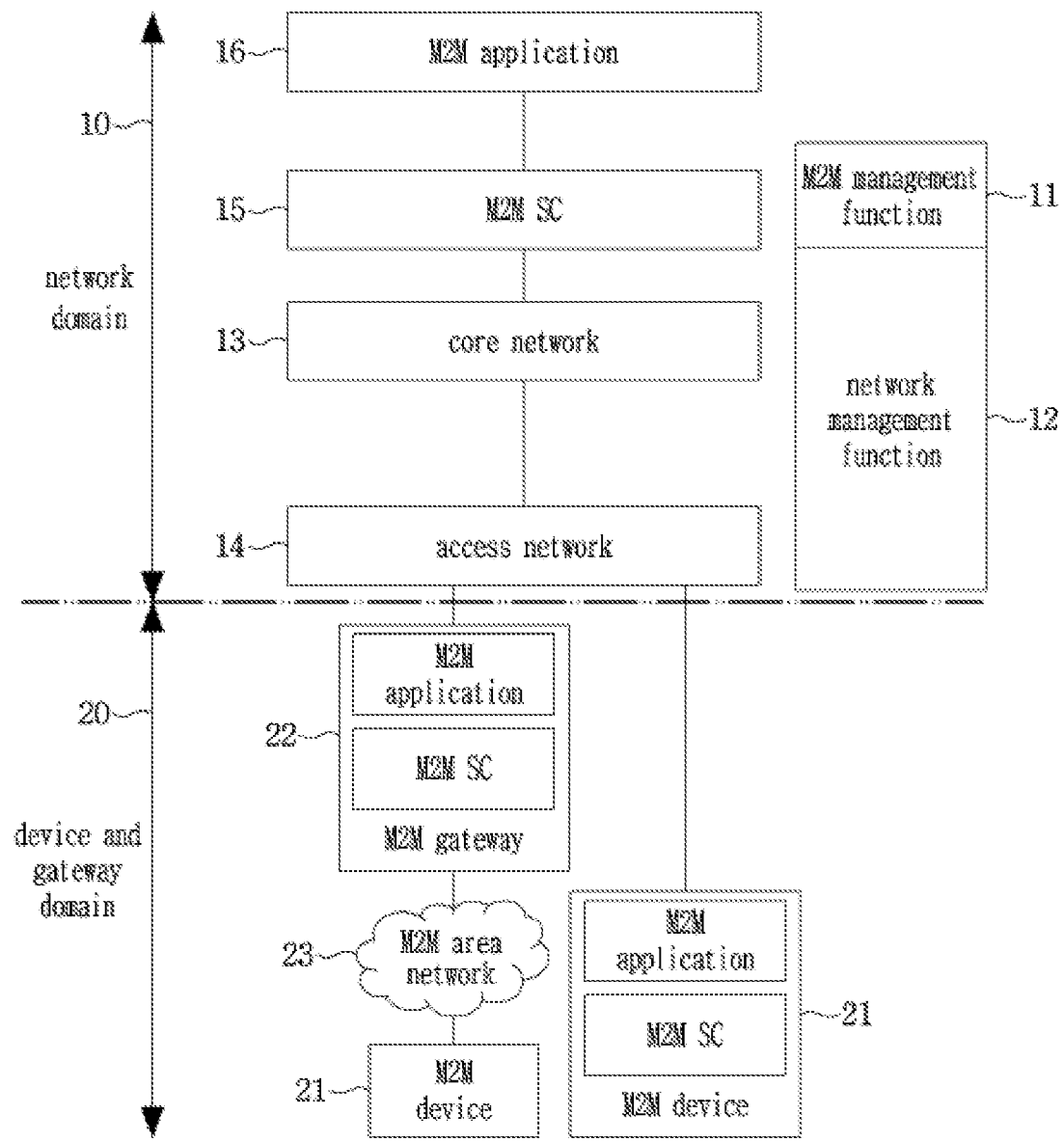
FIG. 1 is a view showing an M2M system according to an embodiment.

Hereinafter, an exemplary embodiment of the present invention will be described with reference to the accompanying drawings for those skilled in the art to easily implement the present invention. However, the present invention may be embodied in many different forms and is not limited to the embodiments described herein.

In the present invention, it will be understood that although the terms first and second are used herein to describe various elements, these elements should not be limited by these terms. Thus, within the scope of this disclosure, a first component in one embodiment may be referral as a second component in another embodiment, and similarly, a second component in one embodiment may be referred as a second component in another embodiment.

In the present invention, if a component were described as "connected", "coupled", or "inked" to another component, they may mean the components are not only directly "connected", "coupled", or "linked", but also are indirectly "connected", "coupled", or "linked" via one or more additional components. In addition, it will be understood that the terms "comprises", "comprising", or "includes" or "including" when used in this specification, specify the presence of one or more other components, but do not preclude the presence or addition of one or more other components unless defined to the contrary.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in one embodiment are also included in the scope of the present invention. In addition, embodiments including other components in addition to the components described in the various embodiments are also included in the scope of the present invention.

In the following description of the at least one embodiment, a detailed description of known functions and configurations incorporated herein will be omitted for the purpose of clarity and for brevity. In addition, parts not related to the description of the present invention in the drawings are omitted, and like parts are denoted by similar reference numerals.

In addition, in an embodiment, a system in the present invention may be a system using IoT (Internet of Things), a M2M (machine to machine) using system, etc. In addition, a system to which the same operation based on the present invention is applied may be a system referred in the present invention, but it is not limited to the above-described embodiment.

In addition, the present specification describes a network based on an M2M communication, and an operation performed in an M2M communication network may be performed while a system managing the corresponding communication network controls the network and transmits data.

In addition, in the present specification, an M2M terminal may be a terminal performing M2M communication, or may be a terminal operating in a wireless communication system taking into account backward compatibility. In other words, an M2M terminal may mean a terminal operating on the basis of an M2M communication network, but it is not limited to an M2M communication network. An M2M terminal may possibly operate on the basis of another wireless communication network, but it is not limited to the above-described embodiment.

In an embodiment, a terminal used in M2M communication may be referral as an M2M device. Herein, an M2M device generally has a feature of low mobility, time tolerant or delay tolerant, small data transmission, etc., and may be used by being connected to an M2M sever centrally storing and managing communication information between machines. In addition, when an M2M device is connected to an M2M server through communication methods different from each other, at a section where a communication method is changed, an M2M device and an M2M server are connected to each other through an M2M gateway, and the entire M2M system may be configured as above. In an embodiment, on the basis of a corresponding system, traffic field services (for example, intelligent transport system (ITS), transportation safety services, etc.), tracking services, metering services, automatic payment systems, medical field services, remote control services, etc. may be provided.

In the present invention, an M2M device may be fixed or movable, and may transmit to and receive from user data or control information or both by performing communication with an M2M server. An M2M device may be referral as terminal equipment, a mobile station (MS), a mobile terminal (MT), a user terminal (UT), a subscribe station (SS), a wireless device, a personal digital assistant (PDA), a wireless modem, a handheld device, etc. In the present invention, an M2M server may be referred as a server for M2M communication, and may be implemented by using a fixed station or mobile station. An M2M server may exchange data and control information by performing communication with M2M devices or another M2M server or both. In addition, an M2M gateway may refer to a device performing a connection point function from one network to another network when a network to which an M2M device is connected and a network to which an M2M server is connected are different. In addition, an M2M gateway may perform a function of an M2M device, in addition, for example, may manage an M2M device connected to an M2M gateway, or may perform a function of message fan out by receiving one message and transmitting the same or modified message to M2M devices connected thereto, or a function of message aggregation. The term of M2M device may be used as a concept including an M2M gateway and an M2M server. Accordingly, an M2M gateway and an M2M server may be referred as an M2M device.

In addition, in the present specification, the term of "entity" may be used to refer to hardware such as an M2M device, an M2M gateway, and an M2M server, or may be used to refer to a software component of an M2M application layer and an M2M (common) service layer which will be described in below.

In below, the present invention is described on the basis of an M2M system, but the present invention is not limited in an M2M system, may be identically or similarly applied, for example, to a system according to a client-server (or sender-responder) model.

FIG. 1 is a view showing an M2M system according to an embodiment.

An M2M system defines a common M2M service framework for various M2M applications. An M2M application 10 may refer to a software component implementing an M2M service solution such as e-Health, city automation, connected consumer, and automotive. In an M2M system, in order to implement various M2M applications, functions that are commonly required may be provided, and the functions that are commonly required may be referred as an M2M service or M2M common service. By using such an M2M common service, an M2M application may be easily implemented without configuring a basis service framework in each M2M application.

An M2M service may be provided in a group form of a service capability (SC) 20, and the M2M application 10 may use an M2M service or function provided by the SC by approaching a SC group or SC through an open interface. An M2M service capability 20 may provide a function constituting an M2M service (for example, device management, location, discovery, group management, registration, security, etc.), and an SC layer or SC entity may be a group of functions for an M2M service which are used when an M2M application is provided on a service framework.

An SC may be represented as xSC. Herein, x may be represented by any one of N/G/D, and represents whether an SC is present in a network (or server or both), in a gateway, or in a device. For example, an NSC represents an SC present on a network or server or both, and GSC represents an SC present on a gateway.

An M2M application may be present on a network, a gateway, or a device. An M2M application present on a network or present by being directly connected to a server may be referral as an M2M network application, briefly, a network application (NA). For example, an NA may be software implemented by being directly connected to a server, perform communication with an M2M gateway or M2M device, and perform functions of managing the M2M gateway or M2M device. An M2M application present on a device may be referred to as an M2M device application, briefly, a device application (DA). For example, a DA may be software executed in an M2M device, and transfer sensor information, etc. to an NA. An M2M application present on a gateway may be referral as an M2M gateway application, briefly, a gateway application (GA). For example, a GA may perform a function of managing an M2M gateway, or provide to a DA an M2M service or function (for example, SCs or SC). An M2M application may refer to an application entity (AE) and an application layer.

Referring to FIG. 1, an M2M system architecture may be divided into a network domain 10, a device, and a gateway domain 20. A network domain may include functions 11 for managing an M2M system and functions 12 for managing a network. A function for managing an M2M system may be performed by an M2M application and M2M SCs managing devices present on a domain of a device and a gateway, and a function for managing a network may be performed by a core network and an access network. Accordingly, in an example of FIG. 1, a core network 13 and an access network 14 may provide a function of connecting respective entities rather than performing an M2M function. By using a core network 13 and an access network 14, M2M communication between M2M SCs may be performed in a network domain 10, a device, and a gateway domain 20, and an M2M application of each domain may transmit and receive a signal or information through M2M SCs of each domain.

An access network 14 is an entity enabling an M2M device and a gateway domain to perform communication with a core network 13. As an example of an access network 14, xDSL (Digital Subscriber Line), HFC (Hybrid Fiber Coax), satellite, GERAN, UTRAN, eUTRAN, wireless LAN, WiMAX, etc. are used.

A core network 13 may be an entity providing a function of IP (Internet protocol) connection, service and network control, interconnection, roaming, etc. A core network 13 may include 3GPP (3rd generation partnership project) core network, ETSI TISPAN (telecommunications and internet converged services and protocols for advanced networking) core network, 3GPP2 core network, etc.

An M2M SC 15 may provide an M2M common service function (CSF) that is possibly shared among various M2M network applications, and enable M2M applications 16 to use an M2M service by exposing M2M services through an open interface. An M2M SCL may refer to a layer including such M2M SC entities or M2M common service functions.

An M2M application 16 is an entity operating a service logic, and possibly using M2M SCs through an open interface. An M2M application layer may refer to a layer including such an M2M application and related-operational logic.

An M2M device 21 is an entity operating an M2M device application through M2M SCs. An M2M device 21 may directly perform communication with an M2M server of a network domain, and perform communication with an M2M server of a network domain through an M2M gateway 22. When connection is performed through an M2M gateway 22, an M2M gateway 22 functions as a proxy. An M2M device 21 may include an M2M application or M2M SCs or both.

An M2M area network 23 provides connectivity between an M2M device and an M2M gateway. Herein, a network between an M2M gateway and an M2M server, and a network between an M2M device and an M2M gateway may be different. In an embodiment, an M2M area network may be implemented by using a PAN (personal area network) technique such as IEEE802.15.1, Zigbee, Bluetooth, IETF ROLL, ISA100.11a, etc. and a local network technique such as PLC (power line communication), M-BUS, wireless M-BUS, KNX, etc.

An M2M gateway 22 may manage an M2M application through M2M SCs, and may be an entity providing a service of an M2M application. An M2M gateway 22 may perform a function of a proxy between an M2M device 21 and a network domain 10, and a function of providing a service to a non-compliant M2M device. An M2M gateway 22 may refer to an entity having a gateway function among M2M devices 21. An M2M gateway 22 may include an M2M application or M2M SCs or both.

An M2M system architecture shown in FIG. 1 is an example, and each entity may be referred differently. For example, an M2M SC may be referral as an M2M common service function, and a SCL may be referral as a common service layer or common service entity. In addition, an M2M application may be referred as an application entity, and an M2M application layer may be briefly referral as an application layer. Similarly, each domain may be also referred differently. In one embodiment, a network domain in one M2M system may be referral as an infrastructure domain, and a device and a gateway domain may be referred as a field domain.

As shown in an example of FIG. 1, an M2M system may be understood as a layered structure including an M2M application layer and an M2M SC layer for M2M communication.

Figure 2:
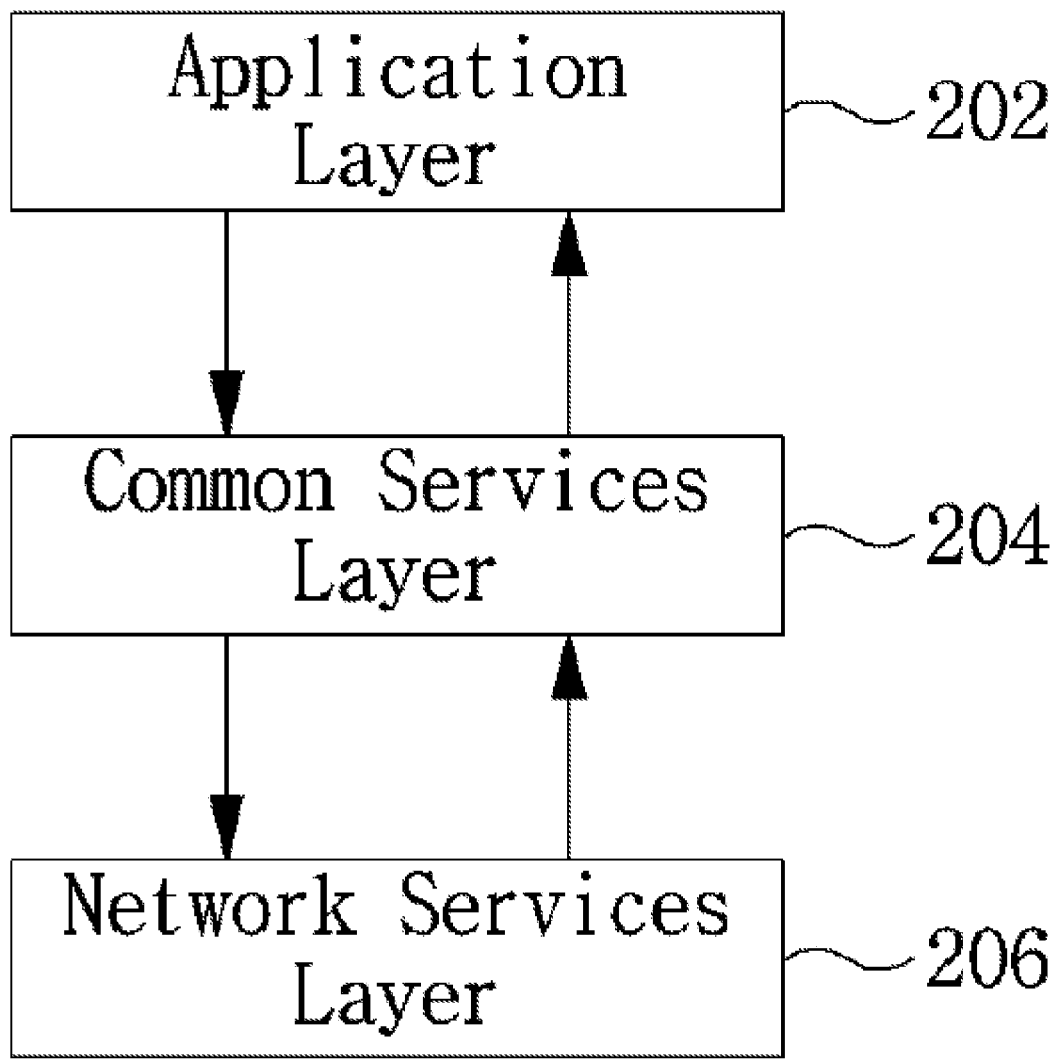
FIG. 2 is a view showing a layered structure of an M2M system according to an embodiment.

FIG. 2 is a view showing a layered structure of an M2M system according to an embodiment.

Referring to FIG. 2, an M2M system may include an application layer 202, a common service layer 204, and an underlying network service layer 206. As described above, the application layer 202 may correspond to an M2M application layer, and the common service layer 204 may corresponds to an M2M SCL. The underlying network service layer 206 provides to the common service layer 204 services such as device management present on a core network, location service, device triggering, etc.

Figure 3:
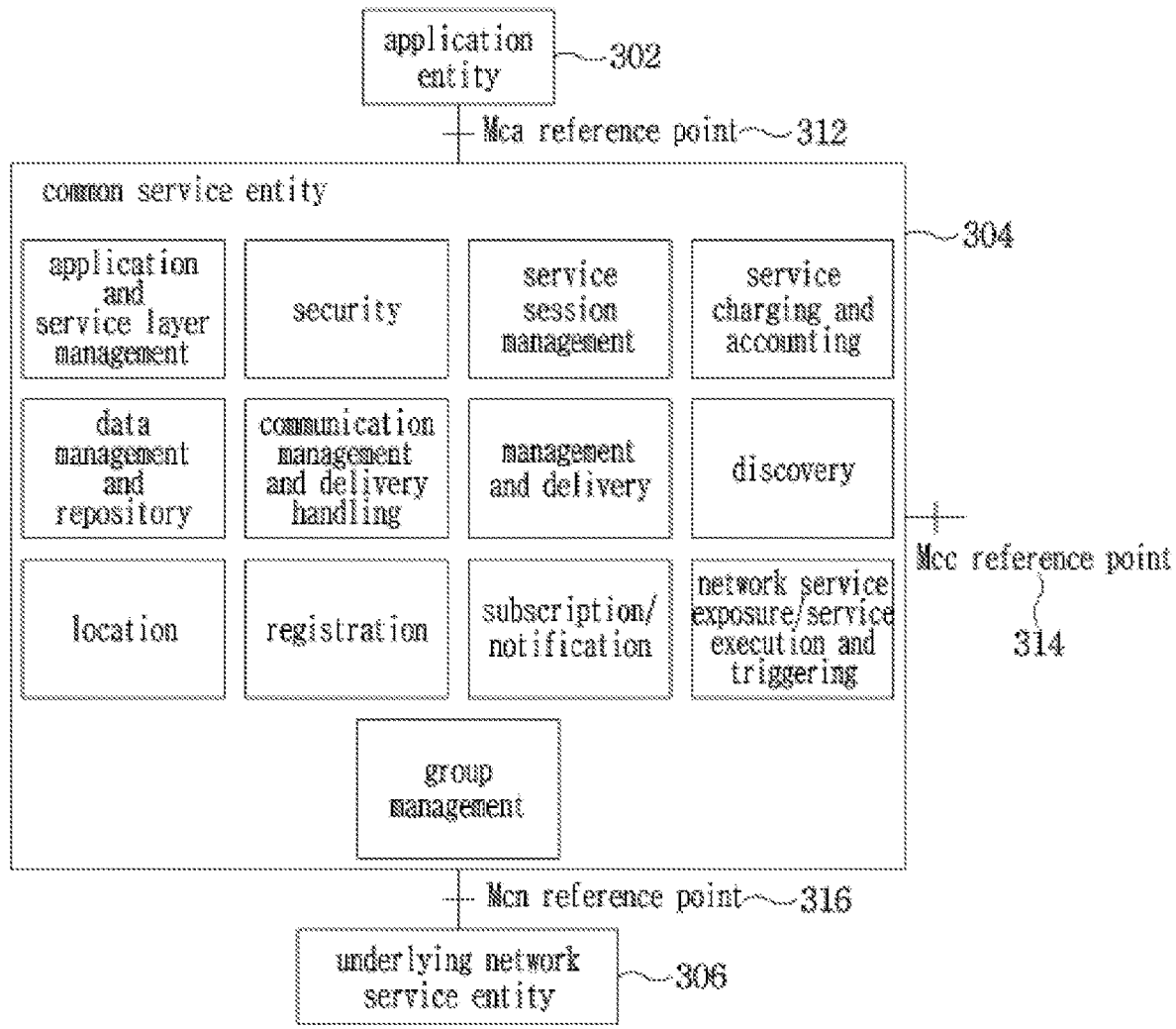
FIG. 3 is a view showing a communication flow between each entity according to an embodiment.

Referring to FIG. 3, an Mca reference point 312 may specify a communication flow of an application entity 302 and a common service entity 304. An Mca reference point 312 may enable the AE 302 to use a service provided from the CSE 304, and enable the CSE 304 to perform communication with the AE 302. An Mca reference point 312 may refer to an interface between an M2M application layer and an M2M common service layer (or entity).

An Mcc reference point 314 may specify a communication flow between other common service entities 304. An Mcc reference point 314 may enable the CSE 304 to use a service of another CSE when providing necessary functions. A service provided through an Mcc reference point 314 may be dependent on functions supported by the CSE 304. An Mcc reference point 314 may refer to an interface between M2M common service layers.

An Mcn reference point 316 may specify a communication flow between the CSE 304 and an underlying network service entity (NSE) 306. An Mcn reference point 316 may enable the CSE 304 to use a service provided from the underlying NSE 306 for providing required functions. An Mcn reference point 316 may refer to an interface between an M2M common service layer, and an M2M underlying network layer.

In addition, in an example of FIG. 3, the CSE 304 may provide various common service functions/capabilities. For example, the CSE 304 may include at least one function of application and service layer management, communication management and delivery handling, data management and repository, device management, group management, discovery, location, network service exposure/service execution and triggering, registration, security, service charging and accounting, service session management, and subscription/notification. The CSE 304 indicates an instance of the common service functions, and provides a sub-set of common service functions possibly used by and shared among M2M applications. Common service functions will be schematically described in below.

Application service layer management (ASM): providing management functions of AEs and CSEs. For example, an ASM function may configure a function of CSEs, may be a troubleshoot and upgrade the same, and upgrade a function of AEs.

Communication management and delivery handling (CMDH): providing communication with other CSEs, AEs, and NSEs. For example, a CMDH function may determine when and how to use connection for CSE-CSE communication (CSE-to-CSE communication), and control such that specific requirements are delivered to be delayed.

Data management and repository (DMR): enabling data exchanging and sharing among M2M applications. For example, a DMR function may collect/aggregate a large amount of data, and convert data into a specific format, and store the same.

Device management (DMG): in addition to an M2M gateway and an M2M device, managing a device function for devices present on an M2M area network. For example, a DMG function may perform application installation and configuration, firmware update, logging, monitoring, diagnostics, network topology management, etc.

Discovery (DIS): searching information such as information and resource according to a request within a designated range and condition.

Group management (GMG): for example, a group may be created by combining resource, an M2M device, or an M2M gateway, and a GMG function may perform handling a request related to the group.

Location (LOC): obtaining positional information of an M2M device or M2M gateway by an M2M application.

Network service exposure/service execution and triggering (NSSE): enabling communication of a underground network, and enabling to use a service or function provided from the underground network.

Registration (REG): performing a function of registering M2M application or another CSE to a specific CSE. Registration may be performed to use an M2M service function of a specific CSE.

Security (SEC): performing a function of handling sensitive data such as a security key, security association establishment, authentication, authorization, ID (Identity) protection, etc.

Service charging and accounting (SCA): performing a function of providing charging and accounting to an AE or CSE.

Service session management (SSM): performing a function of managing an M2M session of a service layer for end-to-end communication.

Subscription/notification (SUB): performing a notification function when a subscription for change in a specific resource is performed and the corresponding resource has been changed.

Figure 4:
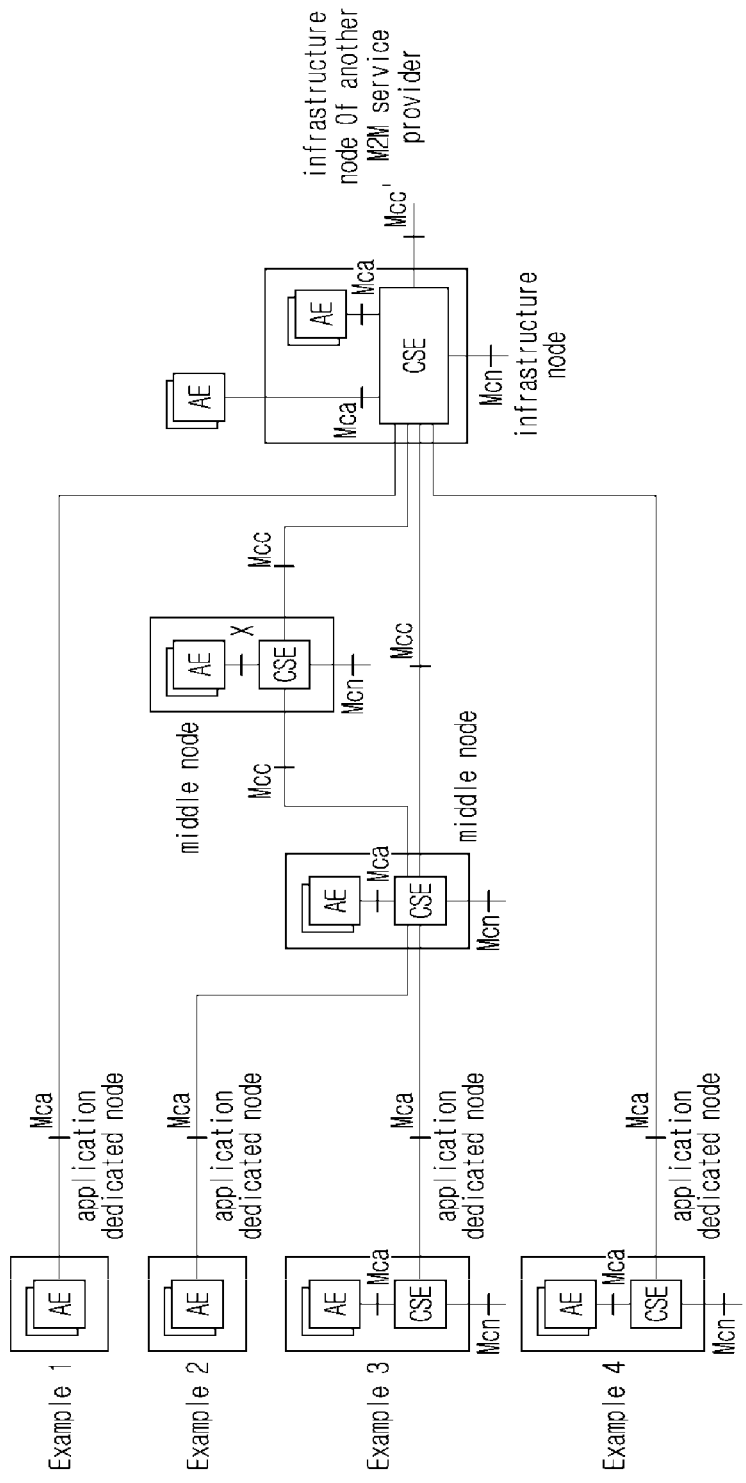
FIG. 4 is a view showing a configuration of an M2M system according to an embodiment.

FIG. 4 is a view showing a configuration of an M2M system according to an embodiment. In the present specification, a node means an entity including at least one M2M application or an entity including one CSE and at least zero M2M application.

An application dedicated node (ADN) may refer to a node including at least one application entity but not including a common service entity. An ADN may perform communication with one middle node (MN) or one infrastructure Node (IN) through an Mca. An ADN may be referred as an M2M device having a constrained capability, and the M2M device having a constrained capability may refer to a common service layer or M2M device not including a common service entity. An M2M device having a constrained capability may be briefly referred as a constrained M2M device.

An application service node (ASN) may refer to a node including at least M2M application entity and at least one common service entity. An ASN may perform communication with one middle node or one infrastructure Node through an Mca. An ASN may be referred as an M2M device.

A middle Node may refer to a node having one common service entity and at least zero M2M application entity. An MN may perform communication with one IN or another MN through an Mcc, perform communication with an IN/MN/ASN through an Mcc, or perform communication with an ADS through an Mca. An MN may be referred as an M2M gateway.

An infrastructure node may refer to a node including one common service entity and at least zero application entity. An IN may perform communication with at least one MN or with at least one ASN or both through an Mcc. Alternatively, an IN may perform communication with at least one ADN through an Mca. An IN may be referral as an M2M server.

Referring to FIG. 4, a first example shows communication between an ADN and an IN. An ADN may be a M2M device having a constrained capability. Herein, an ADN does not include a CSE or common service layer, and thus performs communication with a CSE of an IN through an Mca. In addition, herein, an ADN does not include a CSE or common service layer, and thus may not store/share with another entity data created in an AE or application layer. Accordingly, in the "first example", data created in an AE of an ADN or application layer may be stored and shared in a CSE of an IN.

In an example, a "second example" shows communication between an ADN and an MN. An ADN may be also an M2M device having a constrained capability. Accordingly, an ADN may operate similar to the first example except that the ADM performs communication with a CSE of an MN. In other words, an ADN may perform communication with a CSE of an MN through an Mca. In addition, an ADN does not include a CSE or common service layer, and thus may not store/share with another entity data created in an AE or application layer. Accordingly, data created in an AE of an ADN or application layer may be stored and shared in a CSE of an MS.

Meanwhile, in the "second example", an MN may perform communication with an IN via an MN. Herein, an MN and an MN, and an MN and an IN may perform communication through an Mcc. An MN may directly perform communication with an IN without passing an MN.

A "third example" shows a communication example between an ASN and an MN. Different to the "first example" or "second example", an ASN includes a CSE or common service layer, and thus may store data created in an AE of an ASN or application layer in his CSE or common service layer. In addition, an AE of an ASN may perform communication with an CSE of an MN through a CSE of an ASN.

A "fourth example" shows a communication example between an ASN and an MN. Comparing with the "third example", a CSE of an ASN may directly perform communication with a CSE of an IN without passing an MN.

An IN may be positioned in an infrastructure domain or network domain, and include one CSE and at least zero AE. INs may perform communication with each other through an Mcc.

Figure 5:
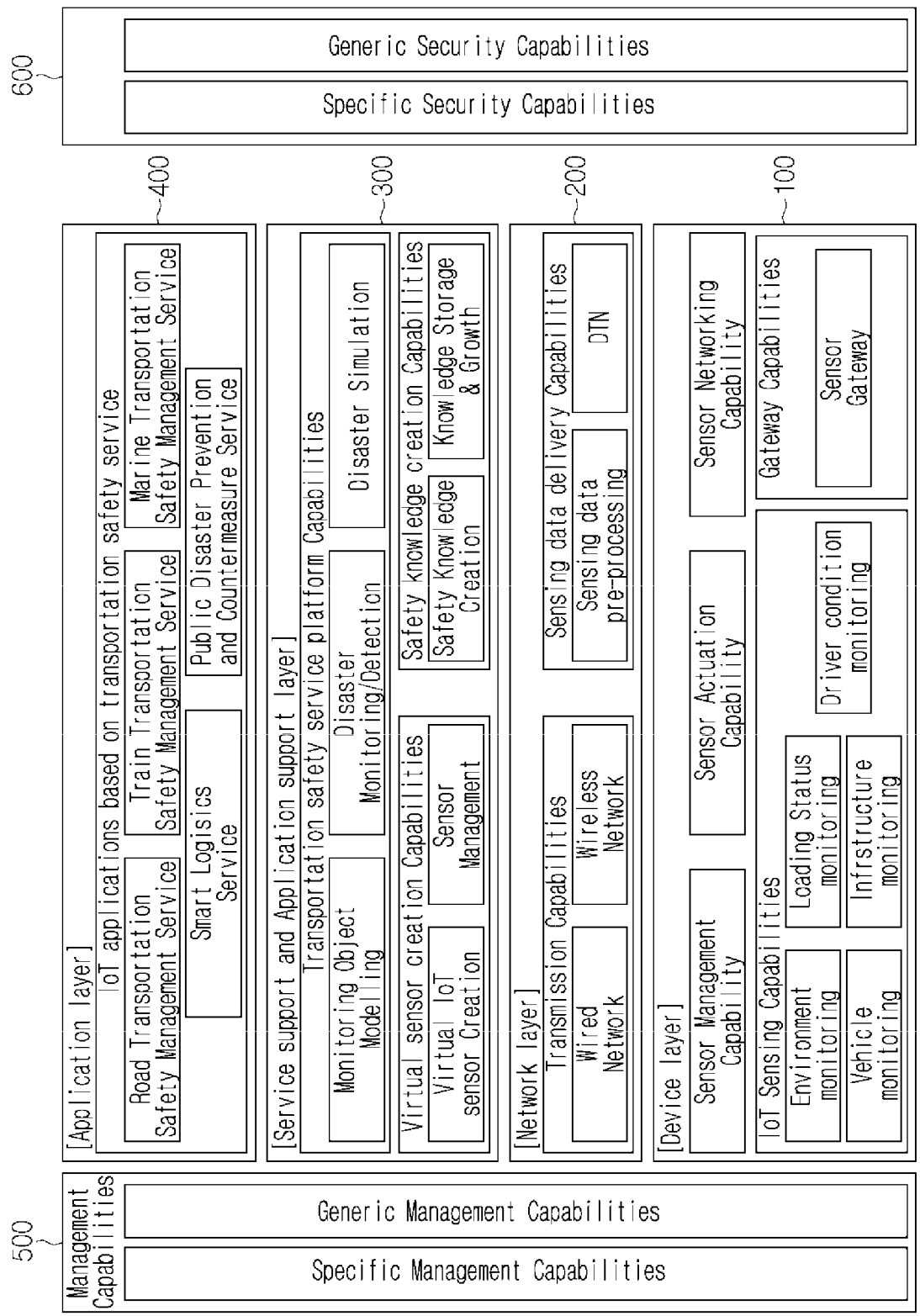
FIG. 5 is a view of an architecture for a transportation safety service according to an embodiment of the present invention.

FIG. 5 is a view of an architecture for transportation safety services according to an embodiment of the present invention. FIG. 5 shows an example architecture of a case where an M2M system according to FIGS. 1 to 4, and a functional architecture are applied to transportation safety services. For example, an architecture for transportation safety services includes four horizontal layers, that is, a device layer 100, a network layer 200, a service support and application support layer 300, and an application layer 400, and two vertical entities, that is, a management entity 500, and a security entity 600. As described with reference to FIG. 1, each may include an M2M service capability, and FIG. 5 may be defined as a capability for providing transportation safety services.

A device layer 100 may obtain sensing data and support various capabilities for delivering/transmitting to the network layer 200. Herein, each of capabilities will be described as below.

① Sensor management capability: a sensor management capability may generate a control message for establishing a sensor, detecting a state of a sensor operation, and managing a sensor. In an example, state information of a sensor may be reported to a service support and application support layer through a sensor gateway. When some IoT sensor malfunctions (for example, a case of a sensor failure where a sensing value of a sensor exceeds a predetermined threshold value), an operation may be performed by enabling the function of a malfunctioning sensor to be taken over by another sensor. In addition, when IoT sensing data is abnormal, a sensor management capability may control the abnormal IoT sensor by cooperating with a sensor actuation capability. In addition, a sensor management capability may manage a power state of a sensor so as to expand an operating life, and control a transmission period of measured data.

② Sensor actuation capability: a sensor actuation capability generates a sensor control message for operating a sensor for a purpose of a user or thing or both. For example, IoT sensor calibration for refreshing or creating a virtual IoT sensor for operation of an IoT sensor may correspond thereto.

③ Sensor networking capability: a sensor networking capability supports a WSN (wireless sensor networking) configuration for vehicles and infrastructures. In case of vehicles, WSN may be inner and outer environments of a vehicle. Particularly, in case of wireless sensing networking, minimizing signal interference is required. In order to expand coverage of a WSN service, a relay supporting a multi-hop relay and mesh networking may be used.

④ Sensor gateway capability: a sensor gateway capability supports an interconnection function between WSN and WCN (wideband communication networking) such as a backbone network or mobile communication network. All of sensing data may be delivered to a network layer through a sensor gateway. A sensor gateway may perform a function of converting protocol between WSN and WCN. In addition, a sensor gateway may provide a GUI (graphic user interface) on the basis of a monitoring function for displaying safety information on a screen of a (bus?) terminal.

⑤ IoT sensing capability: an IoT sensing capability may include vehicle monitoring, infrastructure monitoring, environment monitoring, loading status monitoring, driver condition monitoring, etc.

In addition, capabilities of the network layer 200 will be described as below.

① Transmission capability: a transmission capability may include a wireline network interconnection capability supporting an interconnection function that delivers sensing data to an Internet entity by using a wireline network such as an optical or Ethernet network, and a wireless network interconnection capability supporting a function that delivers sensing data to an Internet entity by using a mobile network and a local wireless network such as 2G, 3G, 4G, and 5G.

② Sensing data delivery capability: a sensing data delivery capability may include a sensing data pre-processing capability and a DTN (delay/disruption tolerant network) capability. Herein, a DTN capability supports interconnection between WSN and Internet networking when a permanent backbone network is not present. Unnamed air vehicles, smartphones, vehicles may provide an intermittent backbone for delivering sensing data stored in a DTN gateway.

In addition, capabilities of the service support and application support layer 300 will be described as below.

① Virtual sensor creation capability: a virtual sensor creation capability may include a capability of creating an IoT sensor and managing a sensor. A virtual sensor creation capability supports a function of creating a new IoT sensor by combining various IoT sensor for monitoring a specific object. Such a function may save cost by avoiding temporary or permanent configuration of new physical IoT sensors. A sensor management capability may support a function of monitoring a state of an IoT sensor such as normal/abnormal state and a power level of a sensor. In addition, an IoT sensor may be remotely controlled by the above function. The above function may cooperate with a sensor management capability of a device layer.

② Transportation safety service platform capability: a transportation safety service platform capability may include a monitoring object modeling capability, disaster monitoring platform, and a disaster monitoring and detection capability. A monitoring object modeling capability may support a function of classifying vehicles and infrastructures by various normal models so as to configure an IoT sensor and for simulation reference. When a new IoT sensor is configured, an IoT sensor configuration point and a number of IoT sensors may be determined by the above function. In addition, accident simulation and disaster prediction may be possible by using the above normal object models. Disaster monitoring platform may possibly estimate a size/severity of the disaster by using IoT sensing data so as to prevent accident. In order to predict disaster, the above platform generates a disaster prediction model by using ioT sensing data. A disaster monitoring and detection capability may support a function of monitoring a disaster display in real-time. When measured data reaches a threshold value, such information may be delivered to disaster simulation platform.

③ Safety knowledge creation capability: a safety knowledge creation capability may perform a safety knowledge creation capability and a knowledge storage and index updating capability. A safety knowledge creation capability may estimate a safety degree of transportation vehicle/infrastructure by analyzing IoT sensing data. In case of vehicle, maintenance history may be also used. A knowledge storage and index updating capability may create a safety index in a knowledge format with context information, and update knowledge information. Safety knowledge of an object may vary under the same condition.

A transportation accident may occur due to a driver state in addition to an abnormal state of a transportation facility. Accordingly, a driver state monitoring capability may be essential. Herein, a driver state monitoring capability may support a function of monitoring a driver state so as to prevent an accident due to a driver state. In an example, driver state information may be monitored by using a specific driver activity pattern by using as a bio sensor provided within a vehicle, wheel movement, push strength of an accelerator, etc. In addition, in an example, road side equipment (RSE) and the center may be involved to monitor and refresh a driver state.

Figure 6:
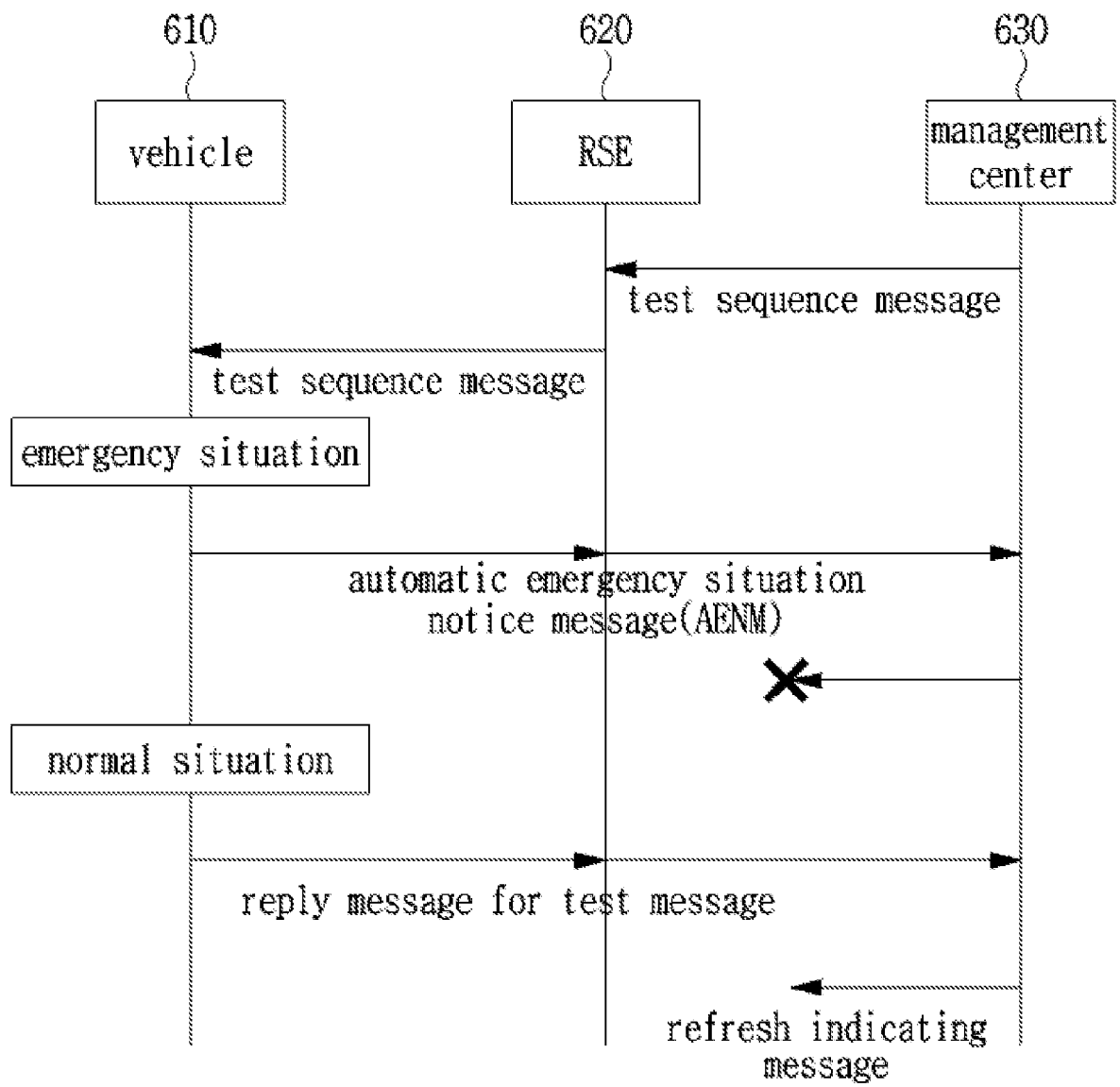
FIG. 6 is a view showing a method of performing driver monitoring when an emergency situation occurs according to an embodiment of the present invention.

In an example, FIG. 6 is a view of a flowchart of driver state monitoring/refreshing by using RSE/management center according to an embodiment of the present invention.

Referring to FIG. 6, a management center 630 or RSE 620 may transmit to a vehicle a test message for monitoring a driver state. In an example, the management center 630 may transmit to the RSE 620 a test message for monitoring a driver state, and the RSE 620 may transmit to a vehicle 610 the received test message for monitoring the driver state. Meanwhile, in an example, the management center 630 may directly transmit to the vehicle 610 a test message, but it is not limited to the above-described example.

In an example, when the vehicle 610 receives a test message, the vehicle 610 (or driver) may perform a reply for the test message according to a predetermined reply method. In an example, the predetermined method may be voice. In addition, the determined method may be manipulation based on a driver activity. In addition, in an example, the determined method may be automatically performed such as iris recognition without a specific activity of a driver, but it is not limited to the above-described example.

Herein, a reply message transmitted by the vehicle 610 on the basis of a driver reply may be transmitted to the RSE 620 or management center 630 or both. In an example, when the vehicle 610 transmits a reply message to the RSE 620, the RSE 620 may re-transmit the reply message to the management center 630. In addition, in an example, the vehicle 610 may directly transmit a reply message to the management center 630, but it is not limited to the above-described example.

Herein, a predetermined time may be set for a reply message. In detail, when the RSE 620 or management center 630 or both do not receive a reply message in a required method within a predetermined time, the RSE 620 or management center 630 or both may transmit to the vehicle a refresh indicating message. In an example, when the vehicle 610 receives a refresh indicating message, the vehicle 610 may reset a condition for receiving a test message, and receive a test message, but it is not limited to the above-described example.

In addition, in an example, when the RSE 620 or management center 630 or both do not receive a reply message in a required method within a predetermined time, the RSE 620 or management center 630 or both may perform counteractive activities. Herein, in an example, a refresh indicating message may be one of the above-described counteractive activities. In addition, in an example, the RSE 620 or management center 630 or both may perform an action on the basis of driver monitoring such that a driver possibly drives normally, but it is not limited to the above-described example.

However, the above-described counteractive activity may cause the driver to drive normally, but under an emergency situation, the same may become a disturbing activity, and thus causing a problem in safety. Accordingly, taking into account such a situation, restriction may be required for the above-described activity, which will be described later.

Meanwhile, a test sequence message is described in FIG. 6, and a test message may be configured while having a certain sequence. However, in below, for convenience of description, it is referral as a test message.

In an example, when an urgency state occurs in a vehicle 610 or a test message is delivered to the vehicle 610 (or driver), the vehicle may check whether or not is an emergency situation since the same may interfere with safety. Herein, an emergency situation may be determined according to a preset method such as vehicle velocity information, location information, wheel movement, driver seat setting, etc. In detail, the above-described conditions may be parameterized, a predetermined function or predetermined threshold value may be set, and when a case where exceeds the threshold value, it may be recognized as an emergency situation. However, a method of determining whether or not there is an emergency situation may be variously set, and it is not limited to the above-described example.

Herein, when it is determined to be under an emergency situation, a test message may not be notified or displayed to a driver. In an example, a test message may be notified to the vehicle 610, and the vehicle 610 may recognize an emergency situation, but not display the test message. In addition, in an example, when the vehicle 610 recognizes an emergency situation, the vehicle 610 may not receive a test message itself from the management center 630, but it is not limited to the above-described example.

Herein, in an example, under an emergency situation, in order to minimize additional test message transmission, the vehicle 610 may automatically notify the RSE 620 or management center 630 or both of an automatic emergency notify message (AENM). Herein, in an example, when the vehicle 610 transmits to the RSE 620 an AENM, the RSE 620 may transmit to the management center 630 the AENM. In addition, in an example, the vehicle 610 may directly transmit to the management center the AENM, but it is not limited to the above-described example.

Herein, the RSE 620 or management center 630 or both may not perform transmission of a test message or refresh indicating message or both. In addition, in an example, the RSE 620 or management center 630 or both may not perform transmission of a test message or refresh indicating message or both during a preset time. In other words, when a preset time elapses, an emergency situation is considered to be resolved, and thus the RSE 620 or management center 630 or both may transmit again a test message or refresh indicating message or both.

Figure 7:
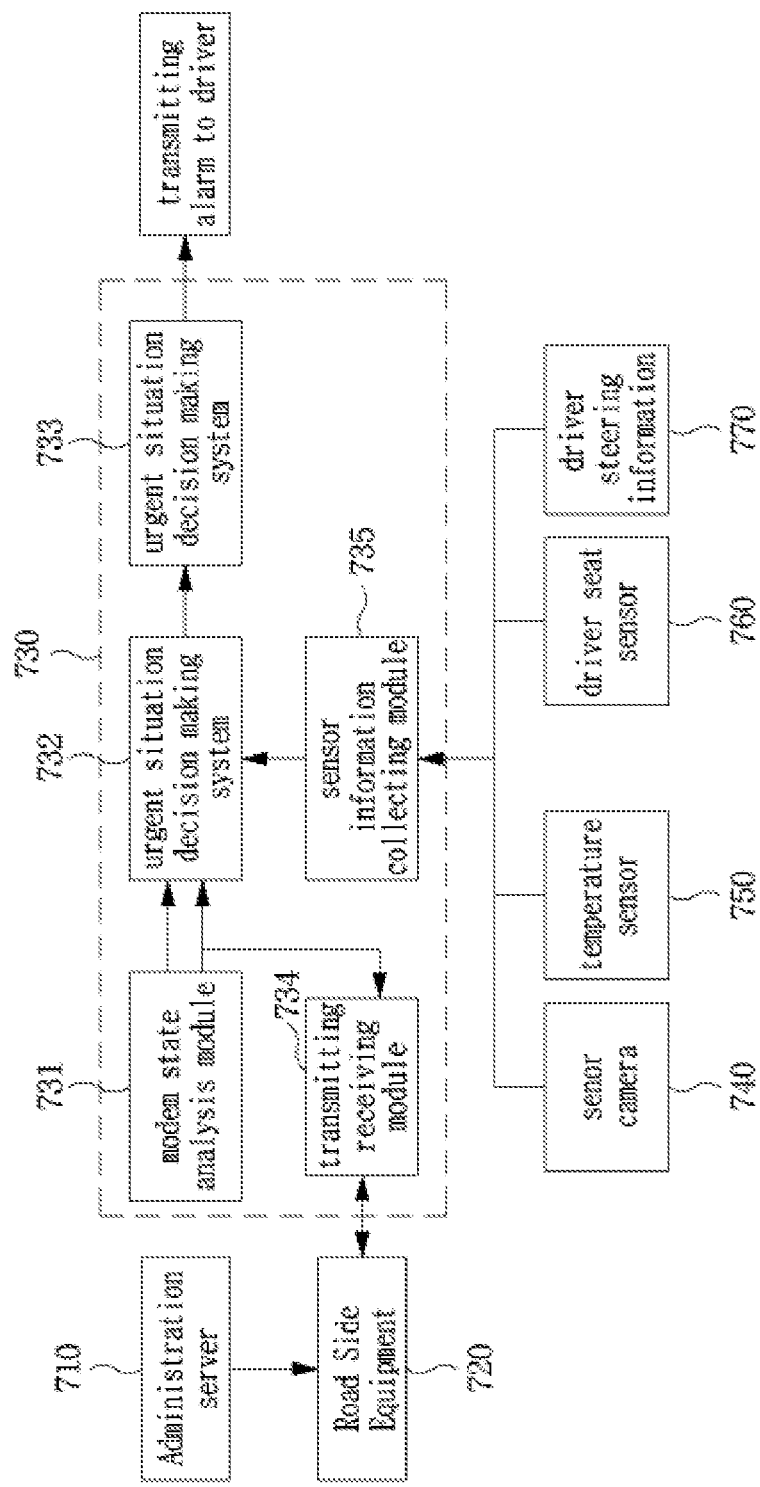
FIG. 7 is a view showing a method of performing driver monitoring when an emergency situation occurs by a vehicle, an RSE, and a management server according to an embodiment of the present invention.

FIG. 7 is a view showing a method for a driver state monitoring system.

Referring to FIG. 7, a management server (administration Server) 710 may perform communication with an RSE 720. In other words, the management server 710 and the RSE 720 may transmit data to and receive data from each other. In addition, the vehicle 730 may transmit and receive data by performing communication with the RSE 720. In detail, data communication with the RSE 720 and monitoring a driver state may be performed on the basis of a driver state monitoring system of the vehicle 730.

In an example, a transmitting receiving module 734 of the vehicle 730 may transmit data to and receive from data the RSE 720 on the basis of the driver state monitoring system. In an example, the above-described test message may be received, and a reply for the same may be transmitted by using the transmitting receiving module 734 of the vehicle 730. Subsequently, the test message received in the transmitting receiving module 734 may be delivered to an urgent situation decision making system 732. Herein, in an example, the urgent situation decision making system 732 may receive information for determining whether or not to be under an urgent situation (or emergency situation) from a modem state analysis module 731 and a sensor information collecting module 735 of the vehicle 730. In an example, the modem state analysis module 731 may determine whether or not transmitting and receiving a single is abnormal, and deliver information of the same to the urgent situation decision making system 732. Meanwhile, the sensor information collecting module 735 may deliver information collected from various sensors 740, 750, 760, and 770 to the urgent situation decision making system 732. Herein, in an example, various sensors may be a sensor camera 740, a temperature sensor 750, a driver seat sensor 760, driver steering information 770, etc., but it is not limited to the above-described example.

Meanwhile, a sensor required for determining whether or not to be under an urgent situation may be preset, but it is not limited to the above-described example.

Subsequently, the urgent situation decision making system 732 may determine whether or not to be under an urgent situation on the basis of received information. In detail, the urgent situation decision making system 732 may determine whether or not to be under an urgent situation by comparing sensing values obtained from the sensor information collecting module 735. In addition, the urgent situation decision making system 732 may determine whether or not is an urgent situation on the basis of information received through the modem state analysis module 731. In other words, the urgent situation decision making system 732 may determine whether or not to be under an urgent situation by synthesizing collected information, but it is not limited to the above-described example.

Subsequently, the urgent situation decision making system 732 may transmit information of an urgent situation to a driver informing means determining module 733, and the driver informing means determining module 733 may provide a notice to the driver. Herein, in an example, taking into account an urgent situation, whether or not to provide a notice to a driver may be determined, and this is as described above.

Figure 8A:
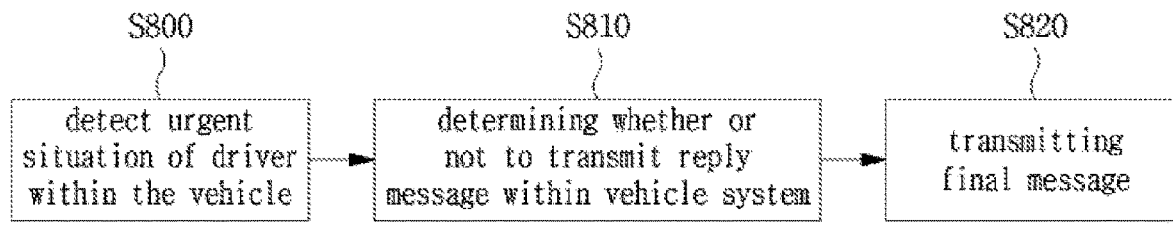
FIGS. 8A and 8B are views showing a method of checking an emergency situation and performing a reply.
Figure 8B:
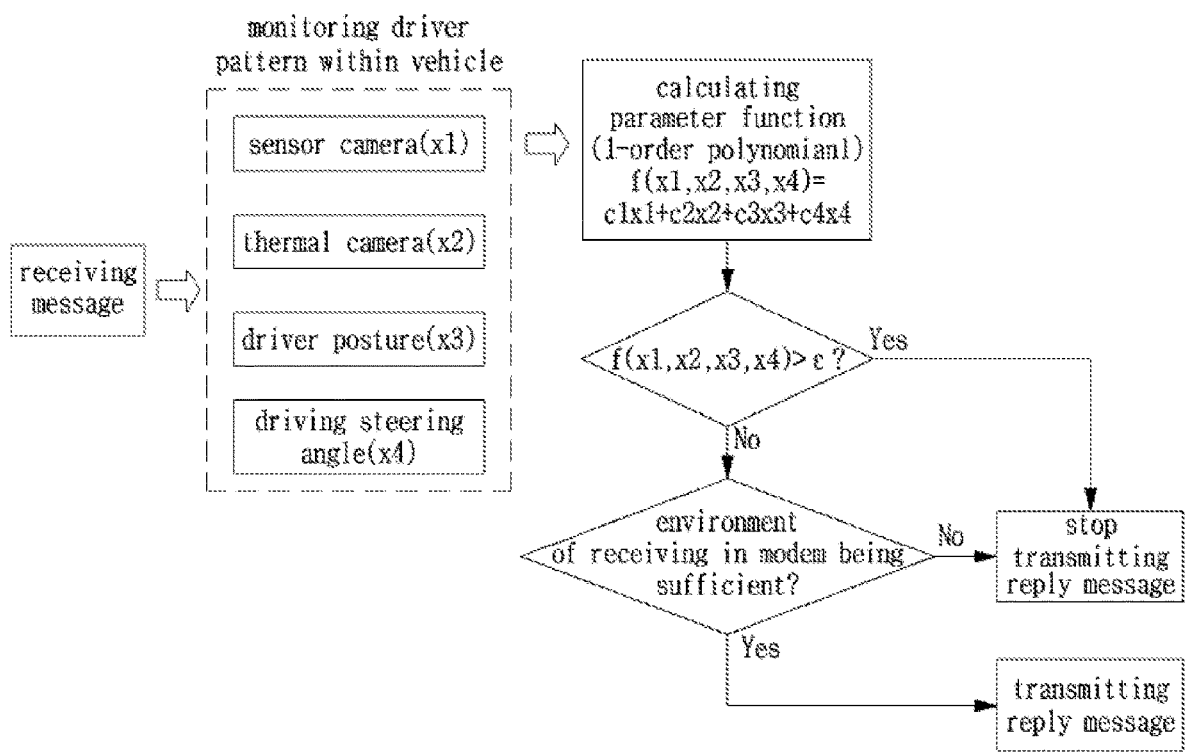

FIGS. 8A-8B are views showing a method of checking an emergency situation and performing a reply.

Referring to FIGS. 8A and 8B, a vehicle may include at least one of a sensor camera, a thermal sensor, a driver posture sensor, and a driving steering angle sensor. In other words, the vehicle may include a sensor for monitoring a driver pattern within the vehicle, but it is not limited to the above-described example. Herein, in an example,c in S800, the vehicle may detect an urgent situation of a driver within the vehicle by monitoring a sudden change of posture and a sudden steering change by using the sensors described above to monitor a driver pattern in the vehicle. Subsequently, in S810, a system within the vehicle may determine whether or not to transmit a reply message. Herein, an urgent situation may be parameterized by using an urgent situation detecting sensor. In detail, a constant according to a risk may be included per predetermined parameter, a parameter may be calculated per predetermined period (e.g. 10 ms), and the parameter may be compared with a predetermined threshold value. When the parameter is equal to or greater than the predetermined threshold value, transmission of a reply message may be restricted. In other words, as described above, when a vehicle receives a test message, and then determines whether or not to be under an urgent situation. When it is determined to be an urgent situation, transmission of a reply message may be restricted.

Subsequently, when the vehicle system determines not to be under an urgent situation, in S820, the vehicle may finally transmit a reply message. A transmission environment for transmitting a message may be evaluated, and when a model transmission environment is not good within an existing vehicle, transmission may be on standby, and transmission may be performed when the transmission environment becomes normal.

In other words, when the vehicle system determines not to be under an urgent situation, a reply for a test message may be transmitted, and on the basis of the same, a message transmitting activity may be performed since even though a refresh command message is received, the same does not affect the activity.

In addition, in an example, FIG. 8B is a view showing a logic for sending a reply by performing parameterizing in FIG. 8A according to an embodiment of the present invention. Referring to FIG. 8B, a vehicle may calculate a parameter function on the basis of a value (x1) obtained from a sensor camera, a value (x2) obtained from a thermal sensor, a value (x3) of a driver posture, and a value (x4) of a driving steering angle. Herein, function types may be variously present. In an example, a function type may be determined according to a vehicle type (compact, medium-sized, large-sized), and a regional condition (large cities, small towns, rural regions). In addition, in an example, proportional constants c1, c2, c3, and c4 according to existing driver habits and a number of passengers may be adjustable. In other words, a function type and proportional constants applied to a parameterized value may be variably set, and it is not limited to the above-described example.

Herein, in an example, whether or not to be under an urgent situation may be determined on the basis of a parameterized value and a predetermined function. Herein, when it is determined to be under an urgent situation, transmission of a reply message for the above-described test message may be stopped. However, when it is determined not to be under an urgent situation, whether or not a modem receiving environment is sufficient may be determined. Herein, when the modem receiving environment is unstable so that is insufficient, transmission of a reply message for the above-described test message may be stopped. However, when the modem receiving environment it is sufficient, transmission of a reply message for the above-described test message may be performed, but it is not limited to the above-described example.

Describing a detail activity on the basis of the above, a transportation accident may occur due to an abnormal state of a driver in addition to an abnormal state of a transportation means facility (transportation facility). In an example, the above-described abnormal state may be a case where a sensor is abnormal. In addition, an abnormal state of a driver may mean the above-described urgent situation.

Accordingly, in order to prevent a transportation accident and improve safety, in addition to monitoring whether or not a transportation means facility is normal, monitoring whether or not a state of the driver is abnormal may be required. For the same, a driver state monitoring (driver condition monitoring) capability may be required.

In detail, as described above, a driver state monitoring capability may be set as a capability of a vehicle device layer. Herein, a driver state monitoring capability may monitor a biological signal that the driver recognizes or does not, and determines whether or not is abnormal. In addition, in an example, for safe driving, through cooperation of the driver and RSE, whether or not a driver state is abnormal may be detected, and refreshing may be performed. In an example, the RSE may transmit a test message and receive a reply message from the driver. By using the same, whether or not the driver state is abnormal may be checked, and this is as described above.

Herein, in an example, the above-described test message may not be transmitted under an emergency situation. Under an emergency situation, transmitting the above-described test message may be meaninglessness. In place of the same, an activity in response to an emergency situation may be required.

In detail, when a preset emergency situation occurs in a vehicle, the vehicle may suspend reporting a test message. Herein, the vehicle may automatically transmit an urgent situation notice message to a management center. In an example, a preset emergency situation may be determined, as described above, by parameterizing values sensed based on various sensors on the basis of a selected function. In other words, it may be determined to be under an emergency situation when sensed values exceed a threshold valued on the basis of the selected function, and this is as shown in FIG. 7B. Meanwhile, in an example, when an emergency situation occurs, a device layer of a vehicle may receive a test message, but not deliver the same to a service support and application support layer. In other words, the vehicle may not transmit a test message to a driver, and suspend reporting the same. Subsequently, the vehicle may automatically transmit an urgent situation notice message to a management center. Accordingly, the vehicle may take necessary steps in an emergency.

In addition, in an example, a reply time may be set for the above-described test message. Herein, when a reply time for a test message has elapsed, the RSE may determine that a driver state is abnormal, and request to perform a counteractive activity. In an example, a counteractive activity may mean a refresh command message. In an example, a counteractive activity may provide a notice for refreshing. In addition, in an example, a counteractive activity may indicate a predetermined activity for refreshing, but it is not limited to the above-described example.

However, in the above-described emergency situation, an action in response to the emergency situation may be required, a counteractive activity based on the above-described test message may disturb the driver to cause an accident under the emergency situation. In other words, considering that is under an emergency situation, the above-described counteractive activity may cause safety problems. Herein, in an example, under an emergency situation, when the driver performs a refresh command by the above-described counteractive activity, safety problems may occur since a driving pattern has been changed. In other words, giving a detailed command to the driver by considering an emergency situation may cause safety problems, and thus performing the same may be refrained. Accordingly, when the RSE and the management center automatically receive an urgent situation notice message, the RSE and the management center may stop performing a counteractive activity. In other words, the RSE and the management center may not transmit a refresh command message. In another example, any one of the RSE and the management center may automatically receive an urgent situation notice message, and stop performing a counteractive activity. In other words, any one of the RSE and the management center automatically receive an urgent situation notice message, and may no transmit a refresh command message.

In other words, the vehicle, the RSE, and the management center may perform driver monitoring based on a test message and a reply message for the same under a normal situation (not in an emergency situation). However, the vehicle, the RSE, and the management center may stop transmitting a test message and performing an additional activity when it is determined to be under an emergency situation and an urgent situation notice message is automatically received. Accordingly, response an emergency situation may be undertaken.

Figure 9:
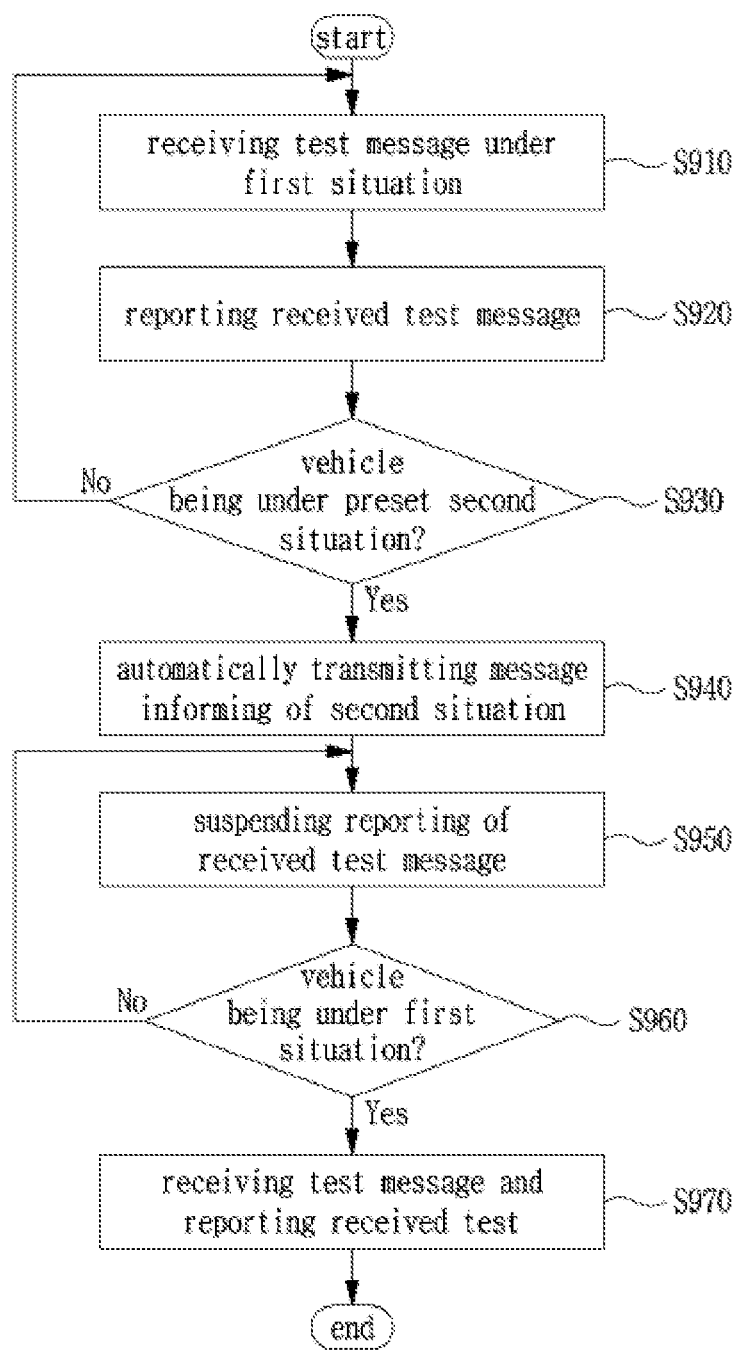
FIG. 9 is a view of a flowchart showing a driver monitoring method according to an embodiment of the present invention.

FIG. 9 is a view showing a driver monitoring method according to an embodiment of the present invention.

Referring to FIG. 9, in S910, the vehicle may receive a test message under a first situation. Herein, as described with FIGS. 1 to 8, a first situation may be a default situation, that is, a normal situation. Meanwhile, a second situation that will be described later may be an emergency situation, and this is as described above. Herein, the vehicle may receive a test message from any one of the RSE and the management center (or management server).

Subsequently, in S920, the vehicle may report the received test message. Herein, as described with reference to FIGS. 1 to 8, the vehicle may report to the driver the received test message. Herein, in an example, a device layer of the vehicle may deliver the received test message to a service support and application support layer, and the service support and application support layer may perform a report on the basis of the delivered test message. Herein, the driver may perform an activity based on the reported test message. In addition, in an example, the vehicle may transmit a reply message for the test message to at least one of the RSE and the management center. Herein, the vehicle may generate a reply message on the basis of a driver activity, and transmit the same. Herein, the vehicle may transmit a reply message within a preset time. In other words, a driver activity may be a reply activity for a test message within a preset time. By using the same, whether or not the driver drives normally may be determined.

Meanwhile, when a reply is not received within a preset time, it may be determined that a driver state is not normal. Herein, at least one of the RSE and the management center may perform a counteractive activity. In an example, a counteractive activity may be a refresh command message. In other words, at least one of the RSE and the management center may send to the driver an activity command related to refresh base on a refresh command message. In other words, a message informing that the driver does not drive normally may be transmitted so that an action for the same is performed on the basis of the same.

Subsequently, when the vehicle is under a preset second situation in S930, in S940, the vehicle may automatically transmit a message informing of the second situation.

Herein, as described with FIGS. 1 to 8, when a default situation is maintained as a first situation, a test message may be periodically transmit, and monitoring a driver state may be performed through a reply message. However, the vehicle may be under a second situation as an emergency situation based on a predetermined condition. Herein, a predetermined condition may be set on the basis of a plurality of sensors or a device included in the vehicle, but it is not limited to the above-described example. In other words, when the vehicle recognizes as an emergency situation, information informing that is under the second situation may be transmitted to at least one of the RSE and the management center without being based on driver or other input. Accordingly, the RSE and the management center may recognize an emergency situation.

Meanwhile, under an emergency situation, in S950, the vehicle may suspend reporting the received test message. Herein, as described with FIG. 1 to FIGS. 8A-8B, reporting a test message under an emergency situation may be meaningless. In other words, an activity for an emergency situation may be necessary, but the test message may not be necessary. Accordingly, the vehicle may not report the test message. In addition, in an example, as described above, a counteractive activity may affect safety of the driver under an emergency situation. Accordingly, when at least one of the RSE and the management center receives a message indicating that is under a second situation, performing the above-described counteractive activity may be stopped. In an example, a counteractive activity may be a refresh command message as described above, and transmission of a refresh command message may be stopped. Accordingly, the above-described activity may not be performed such that an activity necessary for an emergency situation is performed.

Meanwhile, when a condition for an emergency situation is not satisfied, in S960, it may be under a first situation described above. Herein, as described with FIGS. 1 to 8, when an emergency situation is maintained as a second situation, it may be a state where reporting a test message is stopped, and thus the above-described counteractive activity may not be continuously performed.

However, when a normal situation is set as a state where a predetermined condition is not satisfied, in S970, the vehicle may receive again a test message, and report the test message on the basis of the same. Herein, as described with FIGS. 1 to 8, the vehicle may perform the same existing activity when a normal situation is achieved, but it is not limited to the above-described example.

Figure 10:
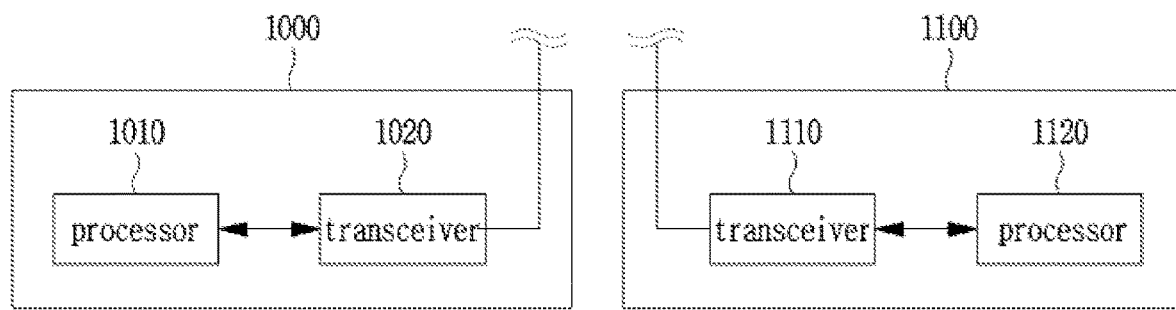
FIG. 10 is a view showing a configuration of a terminal device according to an embodiment of the present invention.

FIG. 10 is a view showing a configuration of a terminal device according to an embodiment of the present invention.

In an example, a device in the present invention may be an M2M terminal device. In addition, a device in the present invention may be a vehicle or other movable object. In other words, a device operating by using IoT may be a device of the present invention, but it is not limited to the above-described embodiment. Hereinafter, it is referral as an M2M terminal device for convenience of description.

An M2M terminal device 1000 may include a processor 1010 controlling the device and a transceiver 1020 transmitting and receiving a wireless signal. Herein, the processor 1010 may control the transceiver 1020. In addition, the M2M terminal device 1000 may perform communication with another M2M terminal device 1100. In an example, each of the above-described transmitter and receiver may be an M2M terminal of FIG. 10. Another M2M terminal device 1100 may also include a processor 1110 and a transceiver 1120, and the processor 1110 and the transceiver 1120 may perform the same function. In addition, a device of FIG. 10 may be another device. In an example, it may be a device such as a device, a vehicle or a base station which performs communication. In other words, it may refer to a device possibly performing communication, but it is not limited to the above-described embodiment.

The above-described embodiments of the present invention can be implemented by various means. In an example, various embodiments of the present invention may be implemented in hardware, firmware, software, or a combination thereof.

As mentioned in the foregoing description, the detailed descriptions for the preferred embodiments of the present invention are provided to be implemented by those skilled in the aft. While the present invention has been described and illustrated herein with reference to the preferred embodiments thereof, it will be apparent to those skilled in the aft that various modifications and variations can be made therein without departing from the spirit and scope of the invention. Thus, it is intended that the present invention covers the modifications and variations of this invention that come within the scope of the appended claims and their equivalents. In addition, although the preferred embodiments of the present invention have been illustrated and described, those skilled in the art will appreciate that the present invention should not be limited to the above specific embodiments and various modifications thereof are possible without departing from the scope and spirit of the invention as disclosed in the accompanying claims and these modifications should not be understood independently of the technical idea of the present invention.

And, both an apparatus invention and a method invention are explained in the present specification and the explanation on both of the inventions can be complementally applied, if necessary.

In addition, while several exemplary embodiments have been particularly shown and described. It will be understood by those skilled in the art that various changes in form and details may be made therein without departing from the spirit and scope of the invention as defined by the appended claims. Therefore, the disclosed embodiments should be considered in an illustrative rather than a restrictive sense. The scope of the invention is defined not by the detailed description but by the appended claims, and all differences within the scope will be construed as being included in the present invention.

What is claimed is:

1. A method of monitoring a driver, wherein a vehicle monitors a driver, the method comprising:
   receiving a test message from a management center under a first situation (first state); and
   reporting to the driver of the vehicle the received test message under the first situation, wherein
   when the vehicle is under a predetermined second situation, reporting the test message is suspended, and a message informing of the second situation is automatically transmitted to the management center.

2. The method of claim 1, wherein when the test message is received under the first situation, the vehicle transmits a reply message for the test message within a preset time to road side equipment (RSE) and the management center.

3. The method of claim 2, wherein when the RSE and the management center do not receive the reply message within the preset time, the RSE and the management center perform a counteractive activity.

4. The method of claim 3, wherein when the RSE and the management center receives the message informing of the second situation, the RSE and the management center stop performing the counteractive activity.

5. The method of claim 1, wherein when the vehicle receives the test message, a device layer of the vehicle delivers the test message to a service support and application support layer of the vehicle.

6. The method of claim 5, wherein the test message is reported to the driver on the basis of the service support and application support layer.

7. The method of claim 1, wherein when the vehicle is under the preset second situation, reporting the test message is suspended for a preset time, and when the preset time elapses, the test message is reported.

8. The method of claim 1, wherein the first situation is a default situation (default state), and the preset second situation is an emergency situation (emergency state).

9. The method of claim 8, wherein when a first condition is satisfied, the vehicle is set to the preset second situation, wherein the first condition is set on the basis of at least one of a plurality of sensors and a modem state.

10. The method of claim 9, wherein the plurality of sensors are sensors related to the driver of the vehicle.

11. A vehicle performing driver monitoring, the vehicle comprising:
    a transceiver transmitting and receiving a signal; and
    a processor controlling the transceiver, wherein
    the processor:
    receives a test message from a management center under a first situation (first state) through the transceiver;
    reports to the driver of the vehicle the test message received under the first situation;
    suspends reporting the test message when the vehicle is under a predetermined second situation; and
    automatically transmits to the management center a message informing of the second situation.

12. The vehicle of claim 11, wherein when the test message is received under the first situation, the vehicle transmits a reply message for the test message within a preset time to RSE and the management center.

13. The vehicle of claim 12, wherein when the RSE and the management center do not receive the reply message within the preset time, the RSE and the management center perform a counteractive activity.

14. The vehicle of claim 13, wherein when the RSE and the management center receive the message informing of the second situation, the RSE and the management center stop performing the counteractive activity.

15. The vehicle of claim 11, wherein when the vehicle receives the test message, a device layer of the vehicle delivers the test message to a service support and application support layer of the vehicle.

16. The vehicle of claim 15, wherein the test message is reported to the driver on the basis of the service support and application support layer.

17. The vehicle of claim 11, wherein when the vehicle is under the preset second situation, reporting the test message is suspended for a preset time, and when the preset time elapses, the test message is reported.

18. The vehicle of claim 11, wherein the first situation is a default situation (default state), and the preset second situation is an emergency situation (emergency state).

19. The vehicle of claim 18, wherein when a first condition is satisfied, the vehicle is set to the preset second situation, wherein the first condition is set on the basis of at least one of a plurality of sensors and a modern state.

20. The vehicle of claim 19, wherein the plurality of sensors are sensors related to the driver of the vehicle.

\* \* \* \* \*